United States Patent
Girt et al.

(10) Patent No.: US 6,645,614 B1
(45) Date of Patent: Nov. 11, 2003

(54) MAGNETIC RECORDING MEDIA HAVING ENHANCED COUPLING BETWEEN MAGNETIC LAYERS

(75) Inventors: Erol Girt, Berkeley, CA (US); Roger Alan Ristau, Livermore, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/902,099

(22) Filed: Jul. 11, 2001

Related U.S. Application Data

(60) Provisional application No. 60/221,459, filed on Jul. 25, 2000.

(51) Int. Cl.$^7$ .............................. G11B 5/66; G11B 5/70; H01J 1/00; B32B 15/00; B05D 5/12

(52) U.S. Cl. ..................... 428/336; 428/216; 428/611; 428/667; 428/668; 428/694 TM; 428/900; 427/128; 427/131

(58) Field of Search ........................ 428/694 TM, 536, 428/216, 900, 611, 668, 667; 427/128, 131

(56) References Cited

U.S. PATENT DOCUMENTS

| | | | |
|---|---|---|---|
| 5,051,288 A | 9/1991 | Ahlert et al. ............... 428/64 |
| 5,408,377 A | 4/1995 | Gurney et al. ............ 360/113 |
| 5,462,795 A | 10/1995 | Shinjo et al. .............. 428/332 |
| 5,598,308 A | 1/1997 | Dieny et al. ............... 360/113 |
| 5,607,740 A | 3/1997 | Noda ........................ 428/65.3 |
| 5,843,589 A | 12/1998 | Hoshiya et al. ............ 428/692 |
| 5,851,643 A | 12/1998 | Honda et al. .............. 428/212 |
| 5,851,656 A | 12/1998 | Ohkubo ..................... 428/332 |
| 5,976,681 A | 11/1999 | Holloway et al. ........... 428/212 |
| 6,013,365 A | 1/2000 | Dieny et al. ............... 428/332 |
| 6,031,692 A | 2/2000 | Kawawake et al. ......... 360/113 |
| 6,068,632 A | 5/2000 | Carchidi et al. .............. 606/79 |
| 6,077,586 A | 6/2000 | Bian et al. ................. 428/65.3 |
| 6,090,498 A | 7/2000 | Omata et al. ............... 428/692 |
| 6,153,320 A | 11/2000 | Parkin ....................... 428/693 |
| 6,159,593 A | 12/2000 | Iwasaki et al. ............. 428/332 |
| 6,165,607 A | 12/2000 | Yamanobe et al. ......... 428/332 |
| 6,171,693 B1 | 1/2001 | Lubitz et al. .............. 428/332 |
| 6,280,813 B1 | 8/2001 | Carey et al. ............... 428/65.3 |
| 6,372,330 B1 * | 4/2002 | Do et al. .................... 428/212 |
| 6,416,839 B1 * | 7/2002 | Xuan et al. ................ 428/65.4 |

OTHER PUBLICATIONS

Abarra et al., "Longitudinal MAgnetic REcording Media With Thermal Stabilization", Apr. 2000, Intermag 2000 conference, p. AA–06.*

Weast, Handbook of Chemistry and Physics, 63$^{rd}$ Edition, 1983, p. E–116.*

* cited by examiner

*Primary Examiner*—Holly Rickman
(74) *Attorney, Agent, or Firm*—McDermott, Will & Emery

(57) ABSTRACT

A high areal recording density magnetic recording medium having improved thermal stability comprises:
- a non-magnetic substrate having at least one surface; and
- a layer stack overlying the at least one surface, comprised of at least one layer pair composed of first and second superposed ferromagnetic layers spaced-apart by a magnetic coupling structure comprising a thin non-magnetic spacer layer and at least one thin ferromagnetic interface layer at at least one interface between the non-magnetic spacer layer and the superposed ferromagnetic layers;
- wherein the thickness of the ferromagnetic interface layer is selected to provide enhancement of the magnetic coupling between the pair of ferromagnetic layers, thereby increasing the thermal stability of the magnetic recording medium.

17 Claims, 6 Drawing Sheets

MAGNETIC RECORDING MEDIA HAVING ENHANCED COUPLING BETWEEN MAGNETIC LAYERS

CROSS-REFERENCE TO PROVISIONAL APPLICATION

This application claims priority from U.S. provisional patent application Ser. No. 60/221,459 filed Jul. 25, 2000, the entire disclosure of which is incorporated herein by reference.

FIELD OF THE INVENTION

The present invention relates to very high areal recording density longitudinal magnetic recording media exhibiting improved thermal stability, such as hard disks. More particularly, the present invention relates to improved magnetic recording media including an interface layer between a spacer layer and a magnetic layer for providing enhanced magnetic coupling, i.e., RKKY-type coupling, between spaced-apart ferromagnetic layers.

BACKGROUND OF THE INVENTION

Magnetic recording ("MR") media and devices incorporating same are widely employed in various applications, particularly in the computer industry for data/information storage and retrieval applications, typically in disk form. Conventional magnetic thin-film media, wherein a fine-grained polycrystalline magnetic alloy layer serves as the active recording medium layer, are generally classified as "longitudinal" or "perpendicular", depending upon the orientation of the magnetic domains of the grains of magnetic material.

A conventional longitudinal recording, hard disk-type magnetic recording medium 1 commonly employed in computer-related applications is schematically illustrated in FIG. 1, and comprises a substantially rigid, non-magnetic metal or glass substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) alloy, a chromium-titanium (Cr—Ti) alloy, a tantalum (Ta) layer, or a tantalum nitride (TaN) layer; a polycrystalline underlayer 12B, typically of Cr or a Cr-based alloy, a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Efforts are continually being made with the aim of increasing the areal recording density, i.e., the bit density, or bits/unit area, and signal-to-medium noise ratio ("SMNR") of the magnetic media. However, severe difficulties are encountered when the bit density of longitudinal media is increased above about 20–50 Gb/in$^2$ in order to form ultra-high recording density media, such as thermal instability, because the necessary reduction in grain size reduces the magnetic energy, $E_m$, of the grains to near the superparamagnetic limit, whereby the grains become thermally unstable. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, is to increase the crystalline anisotropy and therefore increase the magnetic energy of the grains, thus the squareness of the magnetic bits, in order to compensate for the smaller grain sizes. However, this approach is limited by the field provided by the writing head.

Another proposed solution to the problem of thermal instability of very fine-grained magnetic recording media is to provide stabilization via coupling of the ferromagnetic recording layer with another ferromagnetic layer or an anti-ferromagnetic layer. In this regard, it has been recently proposed (E. N. Abarra et al., IEEE Conference on Magnetics, Toronto, April 2000) to provide a stabilized magnetic recording medium comprised of at least a pair of ferromagnetic layers which are anti-ferromagnetically-coupled ("AFC") by means of an interposed thin, non-magnetic spacer layer. The coupling is presumed to increase the effective volume of each of the magnetic grains, thereby increasing their stability; the coupling strength between the ferromagnetic layer pairs being a key parameter in determining the increase in stability.

However, a significant drawback associated with the above approach is observed when a pair of ferromagnetic layers of alloy compositions which exhibit superior performance when utilized in conventional longitudinal magnetic recording media, e.g., Co—Cr and Co—Cr—Pt alloys, are coupled across an interposed thin, non-magnetic spacer layer. Specifically, the observed coupling is, in general, significantly lower than that observed with layers composed of pure (i.e., unalloyed) Co. For example, FIG. 2 shows M(H) loops in the first quadrant for graphically illustrating the decrease in anti-ferromagnetic coupling ("AFC"), i.e., saturation fields, between a pair of $Co_{100-x}Cr_x$ layers across a ruthenium (Ru) non-magnetic spacer layer (where the Ru layer thickness was 8 Å for maximizing the value of AFC), as the amount of Co decreases in sandwich-type $Co_{100-x}Cr_x$ (30 Å)/Ru (8 Å)/$Co_{100-x}Cr_x$ (30 Å) structures, for x increasing stepwise from 0 to 20 (i.e., x=0, 5, 10, 15, and 20). As may be appreciated, the saturation fields, and therefore the strength of AFC, are readily obtained from the graphical plots of M(H) loops of FIG. 2 from the change in slope of M(H) and is seen to steadily decrease with increase in the amount x of Cr alloying element of the CoCr ferromagnetic alloy layers.

Moreover, as is evident from FIG. 3, similar behavior is observed with CoCrPt ferromagnetic alloys, as in sandwich-type $Co_{100-x-y}Cr_xPt_y$ (30 Å)/Ru/$Co_{100-x-y}Cr_xPt_y$ (30 Å) structures, for x=0, 5, 10 and y=0 and 10 (again with the thickness of the Ru spacer layer adjusted to provide the greatest amount of AFC), wherein the AFC decreases with increase in the amount x of Cr and/or the amount y of Pt in the CoCrPt ferromagnetic alloys.

Accordingly, there exists a need for improved methodology for providing thermally stable, high areal recording density magnetic recording media, e.g., longitudinal media, with increased strength magnetic coupling between a pair of ferromagnetic layers separated by a non-magnetic spacer layer (such as of Ru), wherein each of the pair of ferromagnetic layers is formed of a ferromagnetic alloy composition similar to compositions conventionally employed in fabricating longitudinal magnetic recording media, which methodology can be implemented at a manufacturing cost compatible with that of conventional manufacturing technologies for forming high areal recording density magnetic recording media. There also exists a need for improved, high areal recording density magnetic media, e.g., in disk form, which media include at least one pair of magnetically coupled ferromagnetic alloy layers separated by a non-magnetic spacer layer, wherein each of the ferromagnetic layers is formed of a ferromagnetic alloy composition similar to compositions conventionally utilized in longitudinal magnetic recording media and the magnetic coupling between the layers is enhanced, leading to improved thermal stability.

The present invention, therefore, addresses and solves problems attendant upon forming high areal recording density magnetic recording media, e.g., in the form of hard disks, which media utilize magnetic coupling between spaced-apart pairs of ferromagnetic layers for enhancing thermal stability, while providing full compatibility with all aspects of conventional automated manufacturing technology. Moreover, manufacture and implementation of the present invention can be obtained at a cost comparable to that of existing technology.

DISCLOSURE OF THE INVENTION

An advantage of the present invention is an improved, high areal recording density magnetic recording medium having increased thermal stability.

Another advantage of the present invention is an improved, high areal recording density, longitudinal magnetic recording medium having enhanced coupling between spaced-apart magnetic layers.

Yet another advantage of the present invention is an improved method for enhancing coupling between spaced-apart magnetic layers.

Still another advantage of the present invention is an improved method for enhancing coupling between spaced-apart magnetic layers of a high areal recording density magnetic recording medium.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a high areal recording density magnetic recording medium having improved thermal stability, comprising:

a non-magnetic substrate having at least one surface; and
a layer stack overlying the at least one surface, comprised of at least one layer pair composed of first and second superposed ferromagnetic layers spaced-apart by a magnetic coupling structure comprising a thin non-magnetic spacer layer and at least one thin ferromagnetic interface layer at at least one interface between the non-magnetic spacer layer and the first and second ferromagnetic layers;

wherein the thickness of the ferromagnetic interface layer is selected to provide enhancement of the magnetic coupling between the pair of ferromagnetic layers, thereby increasing the thermal stability of the magnetic recording medium.

According to embodiments of the present invention, the magnetic coupling structure is composed of said non-magnetic spacer layer and a ferromagnetic interface layer at one of the interfaces between the first and second ferromagnetic layers and the non-magnetic spacer layer, e.g., the ferromagnetic interface layer is at the interface between the first ferromagnetic layer and the non-magnetic spacer layer or the ferromagnetic interface layer is at the interface between the second ferromagnetic layer and the non-magnetic spacer layer.

In accordance with further embodiments of the present invention, the magnetic coupling structure is composed of the non-magnetic spacer layer and a thin ferromagnetic interface layer at each of the interfaces between the first and second ferromagnetic layers and the non-magnetic spacer layer.

According to still further embodiments of the present invention, the layer stack includes a plurality of layer pairs of first and second ferromagnetic layers, the first and second ferromagnetic layers of each pair being spaced-apart by a magnetic coupling structure comprised of a non-magnetic spacer layer and at least one thin ferromagnetic interface layer.

In accordance with particular embodiments of the present invention, the first and second ferromagnetic layers each comprise an about 10 to about 300 Å thick layer of an alloy of cobalt (Co) with at least one of platinum (Pt), chromium (Cr), boron (B), iron (Fe), tantalum (Ta), nickel (Ni), molybdenum (Mo), vanadium (V), niobium (Nb), and germanium (Ge); the non-magnetic spacer layer comprises an about 2 to about 20 Å thick layer of a non-magnetic material selected from ruthenium (Ru), Ru-based alloys, Cr, and Cr-based alloys, e.g., an about 6 to about 10 Å thick layer of Ru or a Ru-based alloy; and the at least one thin ferromagnetic interface layer comprises an about 1 monolayer thick (i.e., ~1–2 Å) to an about 40 Å thick layer of a ferromagnetic material having a saturation magnetization value $M_s$ >500 emu/cc, e.g., an about 2 to about 20 Å thick layer of Co or a Co alloy with at least one of Pt, Cr, B, Fe, Ni, and Ti, wherein the Co concentration in the alloy may either be constant or varied across the thickness of the interface layer from high near the interface with the spacer layer to low near an interface with a ferromagnetic layer.

According to further embodiments of the present invention, a longitudinal magnetic recording medium comprises:

seed and underlayers between the at least one surface of the substrate and the layer stack for controlling the crystallographic texture of the at least one layer pair of first and second ferromagnetic layers;

a layer stack wherein the first and second superposed ferromagnetic layers are each comprised of an about 10 to about 300 Å thick layer of an alloy of Co with at least one of Pt, Cr, B, Fe, Ta, Ni, Mo, V, Nb, and Ge, the first and second ferromagnetic layers being spaced-apart by a magnetic coupling structure comprising a thin non-magnetic spacer layer comprised of an about 6 to about 10 Å thick layer of Ru or a Ru-based alloy and at least one thin ferromagnetic interface layer comprised of an about 2 to about 20 Å thick layer of Co or a Co alloy; and overcoat and lubricant topcoat layers provided on an upper surface of the layer stack.

According to another aspect of the present invention, a method of forming a magnetic recording medium having improved thermal stability is provided, the method comprising steps of:

(a) forming a layer stack overlying at least one surface of a non-magnetic substrate, the layer stack including at least one layer pair composed of first and second superposed, spaced-apart ferromagnetic layers; and (b) providing a magnetic coupling structure between the at least one pair of first and second ferromagnetic layers, the magnetic coupling structure comprising a thin non-magnetic spacer layer and at least one thin ferromagnetic interface layer at at least one interface between the non-magnetic spacer layer and the first and second ferromagnetic layers;

wherein step (b) includes a step of selecting the thickness of the thin ferromagnetic interface layer of the magnetic coupling structure to provide maximum enhancement of magnetic coupling between the pair of superposed, spaced-apart ferromagnetic layers, for increasing the thermal stability of the magnetic recording medium.

According to embodiments of the present invention, the method comprises providing the ferromagnetic interface layer at one of the interfaces between the first and second ferromagnetic layers and the non-magnetic spacer layer, e.g., at the interface between the first ferromagnetic layer and the non-magnetic spacer layer, or at the interface between the second ferromagnetic layer and the non-magnetic spacer layer.

In accordance with other embodiments of the present invention, the method comprises providing a ferromagnetic interface layer at each of the interfaces between the first and second ferromagnetic layers and the non-magnetic spacer layer.

Embodiments of the present invention include providing each of the first and second ferromagnetic layers as an about 10 to about 300 Å thick layer of an alloy of Co with at least one of Pt, Cr, B, Fe, Ta, Ni, Mo, V, Nb, and Ge; the thin non-magnetic spacer layer as an about 2 to about 20 Å thick layer of a non-magnetic material selected from Ru, Ru-based alloys, Cr, and Cr-based alloys; and the at least one thin ferromagnetic interface layer as an about 1 monolayer thick (i.e., 1–2 Å) to about 40 Å thick layer of a ferromagnetic material having a saturation magnetization value $M_s$ >500 emu/cc.

According to preferred embodiments of the invention, the method comprises providing the thin non-magnetic spacer layer as an about 6 to about 10 Å thick layer of Ru or a Ru-based alloy and the at least one thin ferromagnetic interface layer as an about 2 to about 20 Å thick layer of Co or a Co alloy, wherein the concentration of Co in the alloy is constant or varies across the thickness of the interface layer from high near the interface with the spacer layer to low near an interface with a ferromagnetic layer.

Still another aspect of the present invention is a high areal density magnetic recording medium having improved thermal stability, comprising:

at least one pair of superposed, spaced-apart ferromagnetic layers, and means for enhancing the strength of magnetic coupling between the ferromagnetic layers.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein FIG. 1 schematically illustrates, in cross-sectional view, a portion of a conventional longitudinal-type magnetic disk recording medium.

DESCRIPTION OF THE INVENTION

The present invention is based upon the recognition that high areal recording density magnetic recording media, e.g., longitudinal recording media, having improved thermal stability can be reliably and controllably manufactured by enhancement of the magnetic coupling between a pair of vertically spaced-apart ferromagnetic layers, by interposition of a magnetic coupling structure between the pair of vertically spaced-apart ferromagnetic layers, the magnetic coupling structure being comprised of a thin non-magnetic spacer layer and at least one thin ferromagnetic interface layer of selected thickness at at least one interface between the pair of ferromagnetic layers and the non-magnetic spacer layer, wherein provision of the at least one thin ferromagnetic interface layer provides enhanced magnetic coupling between the ferromagnetic layers, hence increased thermal stability.

The inventive methodology affords several advantages not obtainable according to the conventional art, including, inter alia, increased magnetic coupling between vertically spaced-apart pairs of ferromagnetic layers composed of alloy compositions typically employed in the fabrication of longitudinal recording media, hence improved thermal stability; and reliable, controllable, and cost-effective formation of very high areal recording density magnetic recording media utilizing conventional manufacturing techniques and instrumentalities, e.g., sputtering techniques and apparatus.

According to the invention, a thin ferromagnetic layer is interposed at the interfaces between a pair of ferromagnetic layers sandwiching a non-magnetic spacer layer for increasing the amount of magnetic coupling therebetween. Specifically, studies by the present inventors of a series of sandwich structures including a spaced-apart pair of layers of ferromagnetic alloy compositions similar to those conventionally employed in the fabrication of thin film magnetic recording media, e.g., Co-based magnetic alloy layers with lower concentrations of Co, have demonstrated the beneficial presence of a thin ferromagnetic interface layer, e.g., of Co, at the interface(s) between the Co-based magnetic alloy layer(s) and the non-magnetic thin spacer layer, e.g., of Ru or a Ru-based alloy, on,enhancement of magnetic coupling between the pair of ferromagnetic alloy layers.

Figure 2:
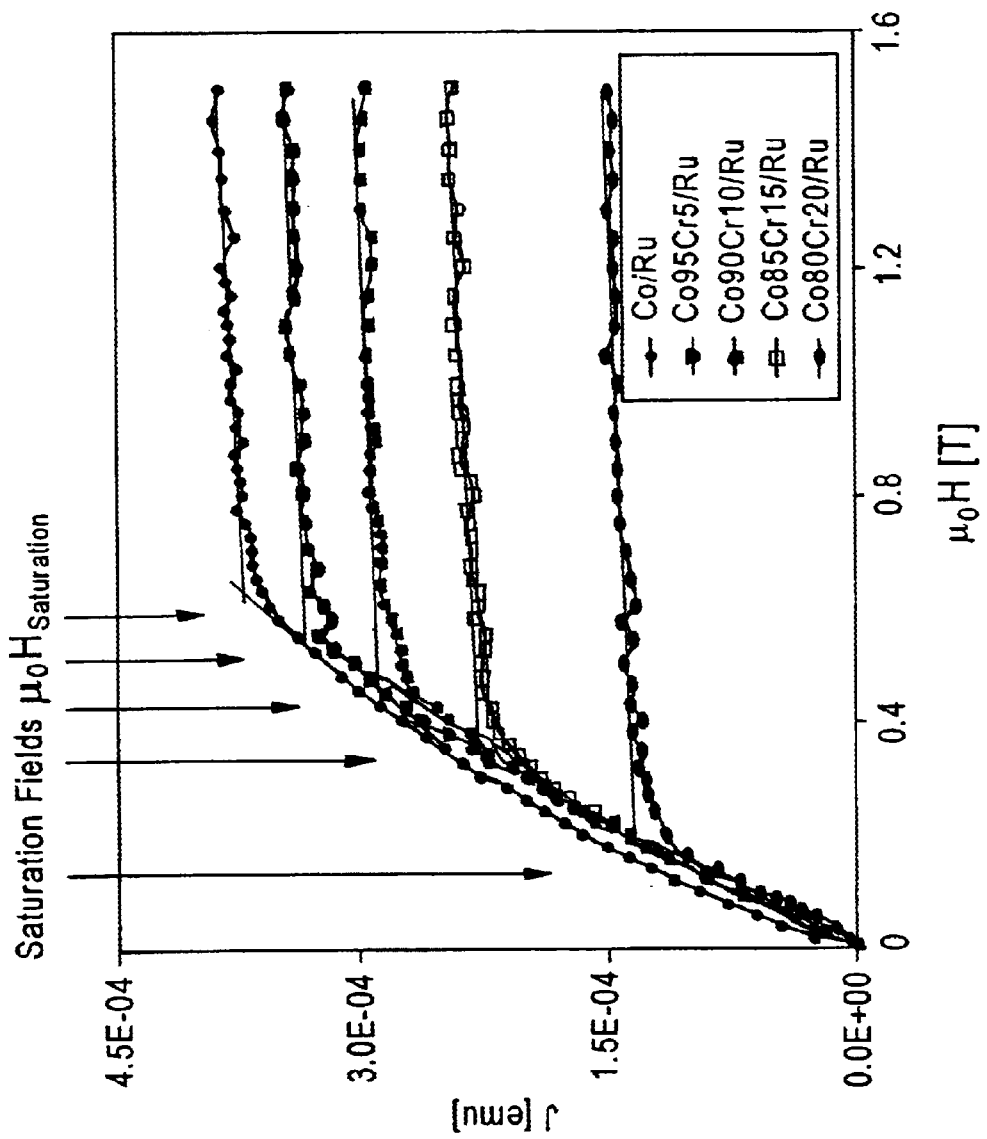
FIGS. 2–3 are graphs showing M(H) loops in the first quadrant of magnetic alloys for determining the effect of alloy composition variation on the saturation field, i.e., strength of AFC, in the absence of coupling enhancement provided by the instant invention.
Figure 3:
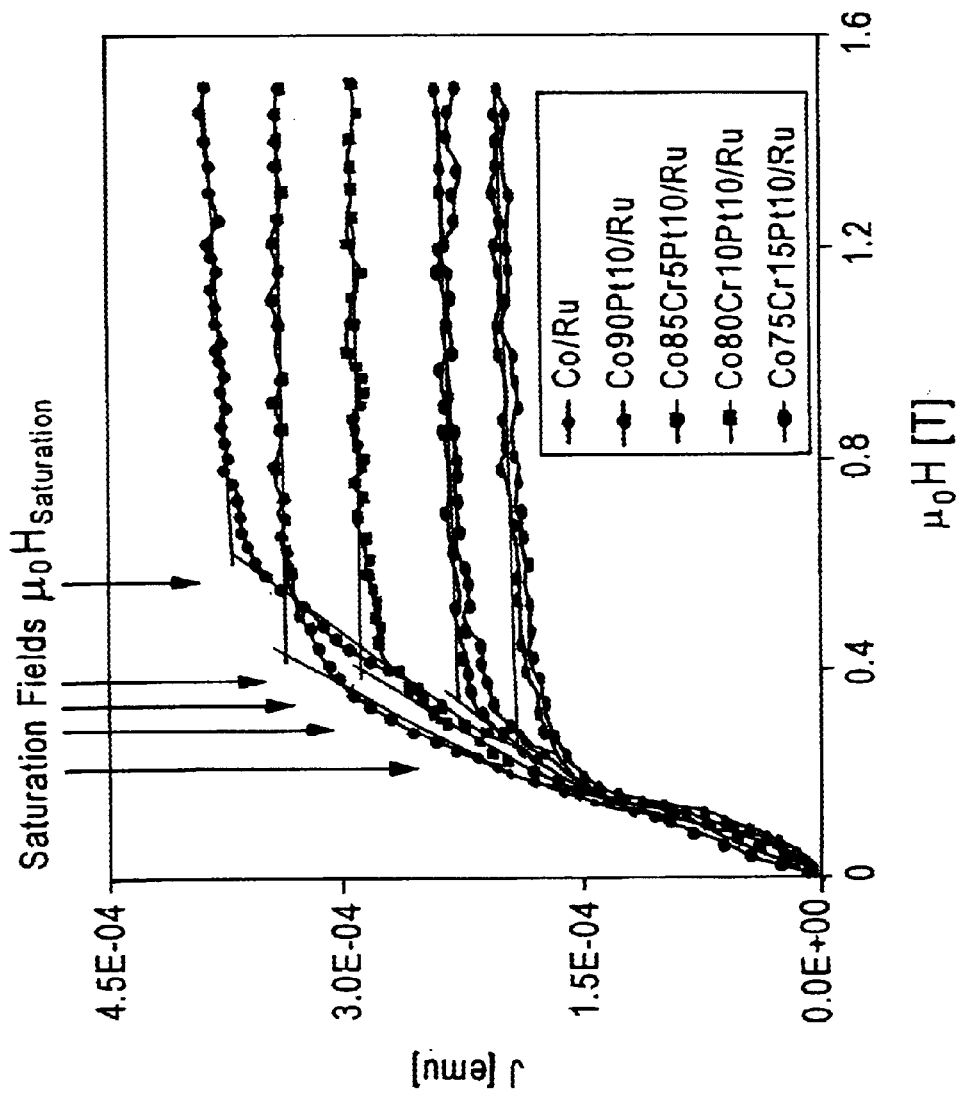
Figure 4:
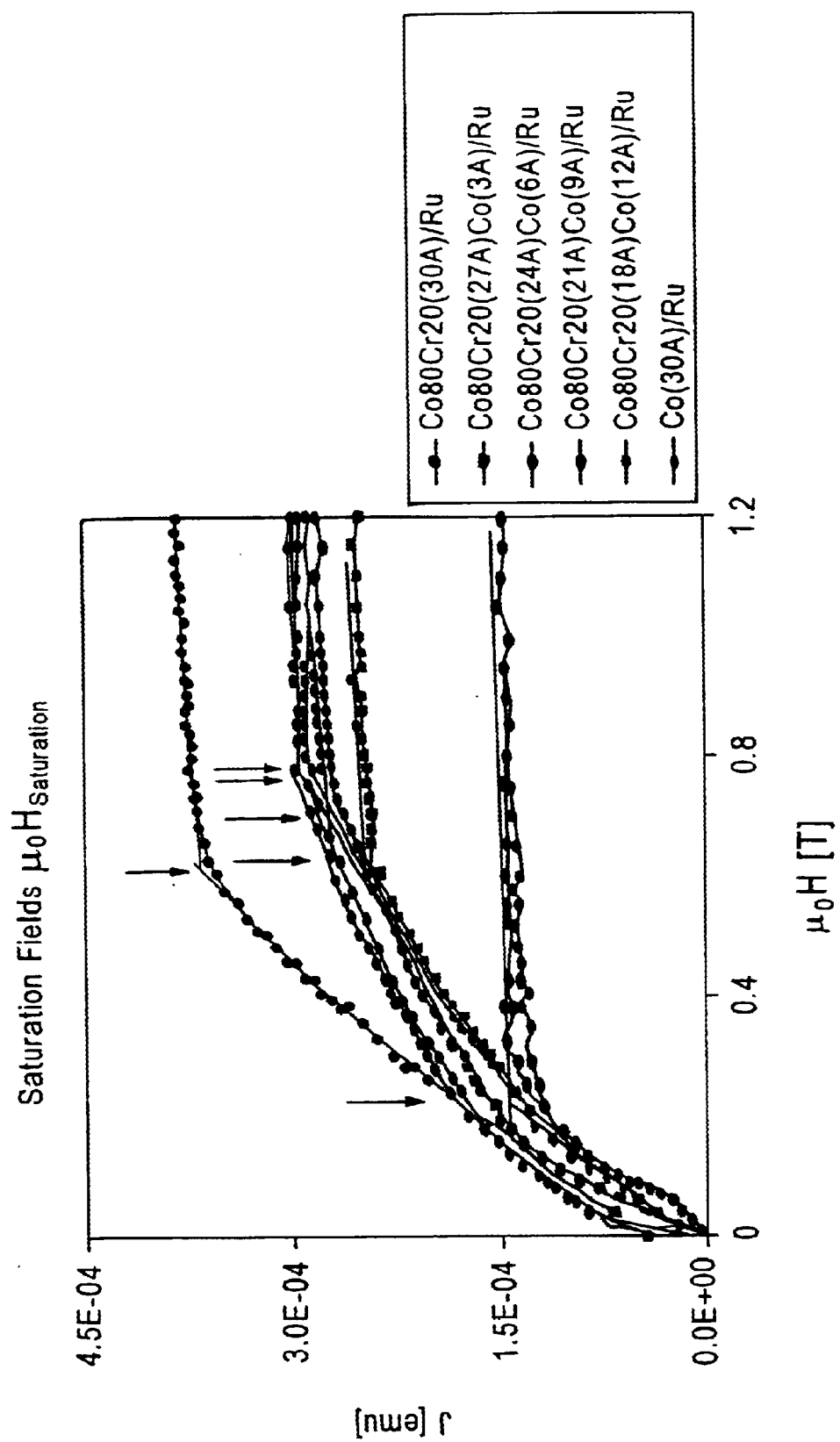
FIG. 4 is a graph showing M(H) loops in the first quadrant for determining the effect of variation of the thickness of an interface layer on the saturation field, i.e., strength of AFC, due to coupling enhancement provided according to the present invention.
Figure 5:
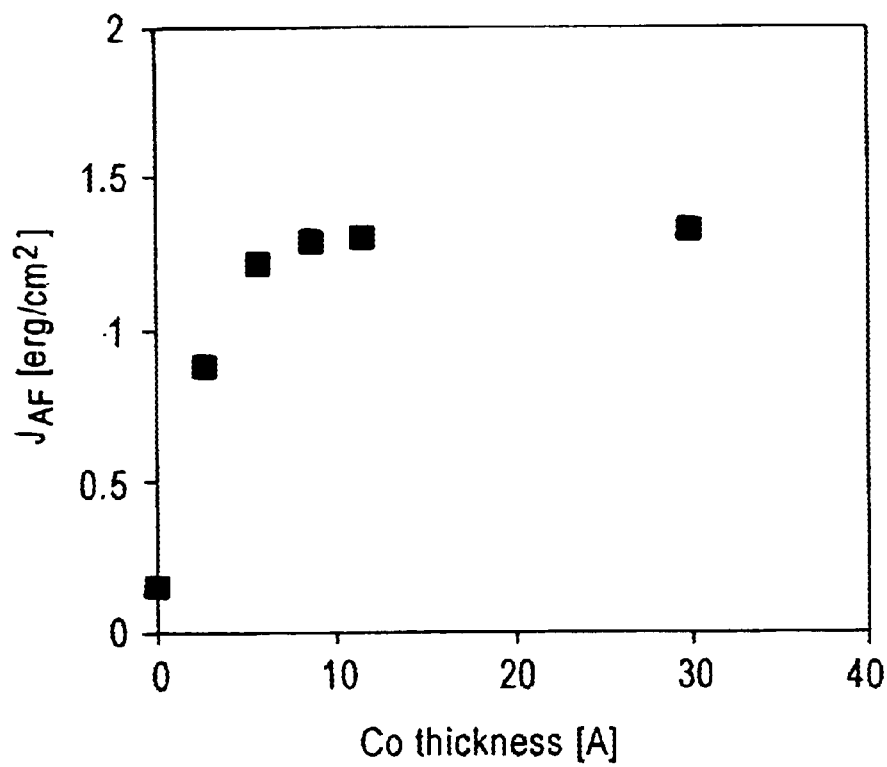
FIG. 5 is a graph for showing the variation of the strength of AFC provided by the present invention as a function of the thickness of the interface layer.

Referring now to FIG. 4, shown therein is a graph illustrating M(H) loops obtained in the first quadrant for ferromagnetic sandwich structures (of similar total thickness) according to the present invention, e.g., $Co_{80}Cr_{20}$ (30–δ Å)/Co (δ Å)/Ru (8 Å)/Co (δ Å)/$Co_{80}Cr_{20}$ (30–δ Å), wherein a thin ferromagnetic interface layer of Co, where δ=3, 6, 9, 12, or 30 Å, is provided at both interfaces between the thin non-magnetic spacer layer (Ru) and a pair of spaced-apart ferromagnetic layers ($Co_{80}Cr_{20}$); and FIG. 5 graphically illustrates the effect of thickness (δ Å) variation of the thin ferromagnetic interface layers according to the present invention on enhancement of coupling strength between the pair of spaced-apart ferromagnetic layers. As is evident from FIGS. 4 and 5, the coupling field and strength of AFC between the spaced-apart $Co_{80}Cr_{20}$ ferromagnetic layers initially increases with increase in the Co interface layer thickness δ up to about 9 Å, and then levels off for Co interface layer thickness δ greater than about 10 Å. While enhanced magnetic coupling between the pair of ferromagnetic alloy layers is evidenced when a ferromagnetic interface layer is provided at only one of the ferromagnetic layer/non-magnetic spacer layers, by providing ferromagnetic interface layers at each ferromagnetic layer/non-magnetic spacer layer interface, the strength of the magnetic coupling therebetween can be increased to that obtained for magnetic coupling between pure Co ferromagnetic layers (see, e.g., FIGS. 2–3), while maintaining a low total magnetization of the pair of ferromagnetic layers. Thus, the coupling field obtained for a $Co_{80}Cr_{20}$ (21 Å)/Co (9 Å)/Ru (8 Å)/Co (9 Å)/$Co_{80}Cr_{20}$ (21 Å) sandwich structure according to the present invention approaches that obtained for a Co (30 Å)/Ru/Co (30 Å) sandwich structure not including the thin ferromagnetic interface layer of the present invention.

Figure 1:
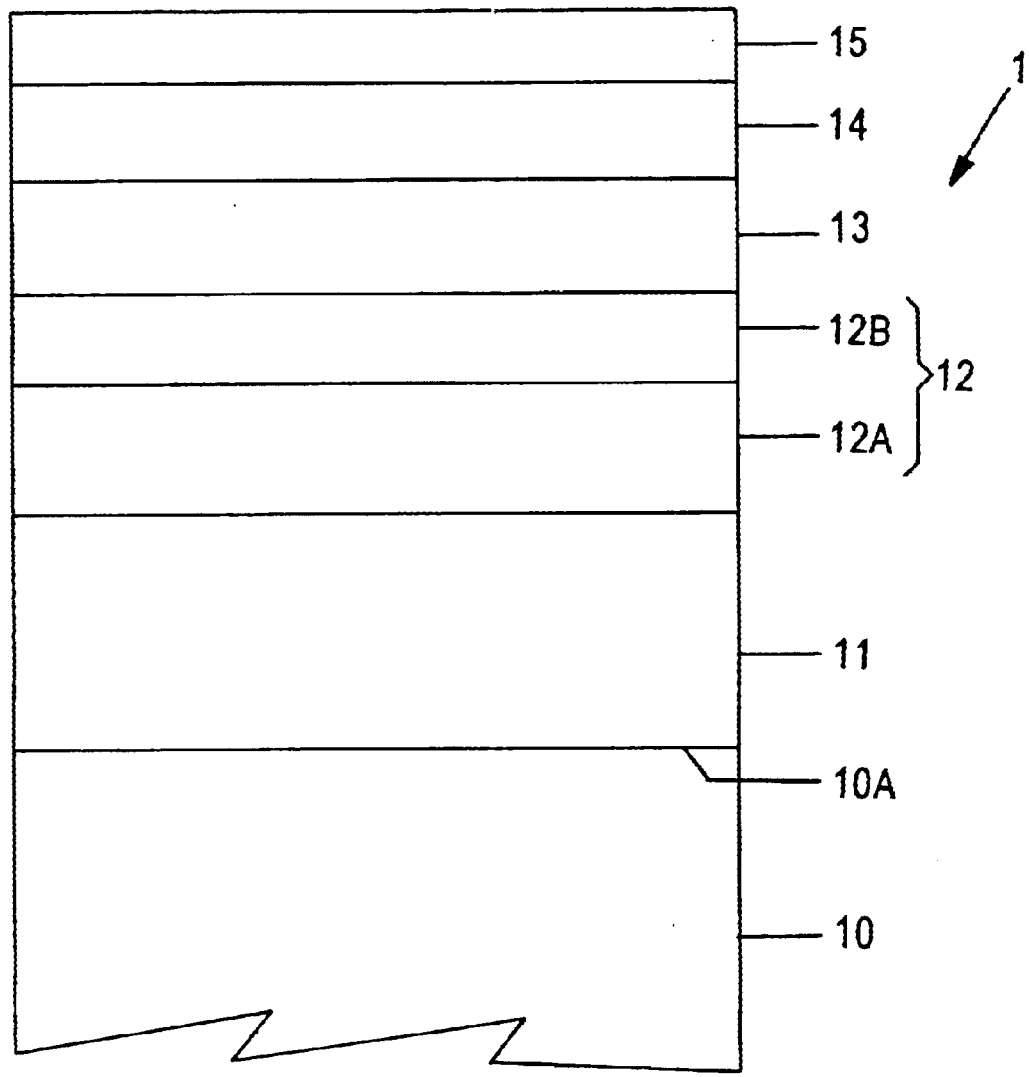
Figure 6:
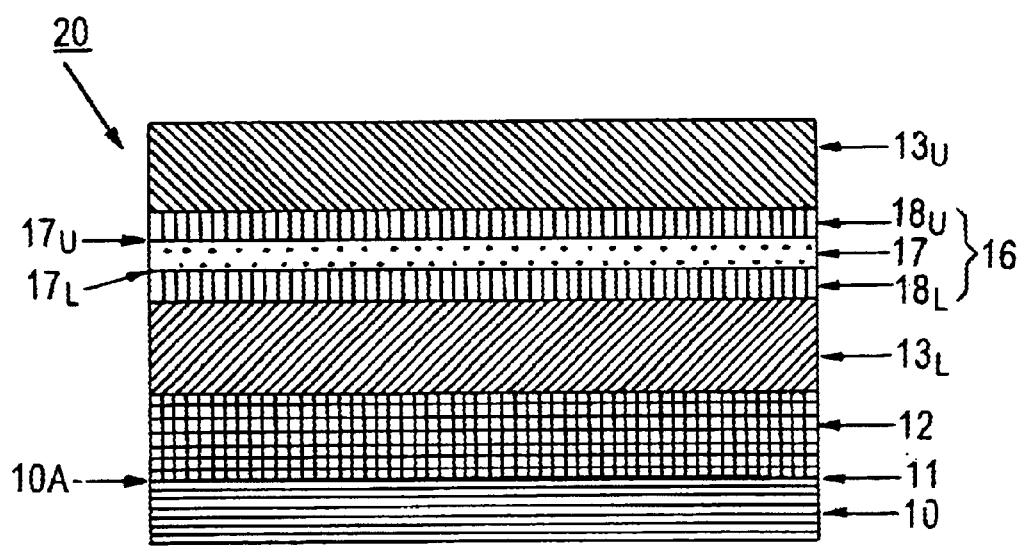
FIGS. 6–9 schematically illustrate, in cross-sectional view, portions of embodiments of magnetic recording media comprising at least one spacer/interface layer structure according to the present invention for providing enhanced coupling between spaced-apart ferromagnetic layers.

FIGS. 6–9 schematically illustrate, in simplified cross-sectional view, several embodiments of magnetic recording media embodying the inventive concept. A first embodiment of a magnetic recording medium 20 according to the invention is shown in FIG. 6 and includes a layer sandwich structure of the type described above in connection with FIGS. 4–5, in which thin ferromagnetic interface layers are provided at both sides of a thin non-magnetic spacer layer for enhancement of the magnetic coupling strength between a pair of spaced-apart ferromagnetic layers, comprising a non-magnetic substrate 10 selected from among non-magnetic metals and alloys, Al, Al-based alloys such as Al-Mg alloys, NiP-plated Al (NiP/Al), glass, ceramics, polymers, and composites of the aforementioned materials. The thickness of substrate 10 is not critical; however, in the case of magnetic recording media for use in hard disk applications, substrate 10 must be of a thickness sufficient to provide the necessary rigidity. Substrate 10 typically comprises Al, an Al-based alloy, or glass, e.g., an Al—Mg alloy, and includes on the surface 10A thereof a plating layer 11, e.g., a layer of amorphous NiP from about 100 Å to about 15 μm thick. Formed on the plating layer 11 is an underlayer layer 12 for controlling the crystallographic texture and properties of ferromagnetic Co-based alloy layers deposited thereover, which underlayer 12 includes first, or lower, and second, or upper, portions 12A and 12B, respectively (see FIG. 1), wherein the first, or lower portion 12A is a seed layer comprised of an amorphous or fine-grained material, e.g., a Ni—Al or Cr—Ti alloy layer or a Ta or TaN layer from about 10 to about 1,000 Å/thick, and the second, or upper portion 12B is a polycrystalline underlayer, typically a Cr or Cr-based alloy layer from about 10 to about 300 Å thick. According to the invention, the single ferromagnetic layer 13 of the conventionally-structured magnetic recording medium 1 of FIG. 1 is replaced with a sandwich-type structure 13' comprised of a pair of strongly magnetically coupled ferromagnetic layers, i.e., a first, or lower, ferromagnetic layer $13_L$ and a second, or upper, ferromagnetic layer $13_U$, which pair of ferromagnetic layers are spaced-apart by a magnetic coupling structure 16 composed of a thin non-magnetic spacer layer 17 having lower and upper surfaces $17_L$ and $17_U$, respectively. Thin non-magnetic spacer layer 17 is in turn sandwiched between a pair of thin ferromagnetic interface layers 18, i.e., a first, or lower, interface layer $18_L$ at the interface between the lower surface $17_L$ of the thin non-magnetic spacer layer 17 and the upper surface of the lower ferromagnetic layer $13_L$ and a second, or upper, interface layer $18_U$ at the interface between the upper surface $17_U$ of the thin non-magnetic spacer layer 17 and the lower surface of the upper ferromagnetic layer $13_U$.

By way of illustration, but not limitation, according to the invention, each of the first, or lower, and second, or upper, ferromagnetic layers $13_L$ and $13_U$, respectively, may comprise an about 10 to about 300 Å thick layer of an alloy of Co with at least one of Pt, Cr, B, Fe, Ta, Ni, Mo, V, Nb, and Ge; the thin non-magnetic spacer layer 17 is selected to provide a large RKKY-type coupling effect, and may comprise nearly any non-magnetic material, e.g., Ru, Ru-based alloys, Cr, and Cr-based alloys, illustratively a layer of Ru or a Ru-based alloy from about 2 to about 20 Å thick, preferably from about 6 to about 10 Å thick; each of the first, or lower, and second, or upper, thin ferromagnetic interface layers $18_L$ and $18_U$, respectively, may comprise a ferromagnetic material having a saturation magnetization $M_s$ >500 emu/cc, e.g., a layer of a high moment Co alloy having a thickness of from about 1 monolayer thick. (i.e., ~1–2 Å) to about 40 Å thick, preferably from about 2 to about 20 Å thick. Each of the layers of the magnetic medium 20, including those of the magnetic coupling structure 16 of the present invention may be deposited or otherwise formed by any suitable physical vapor deposition technique (PVD), e.g., sputtering, or by a combination of PVD techniques, i.e., sputtering, vacuum evaporation, etc. Protective overcoat and lubricant topcoat layers respectively analogous to layers 14 and 15 shown in FIG. 1 are provided, in conventional fashion, over the upper surface of the second, or upper, ferromagnetic layer $13_U$, which layers are not shown in FIGS. 6–9 in order not to unnecessarily obscure the key features of the invention.

Figure 7:
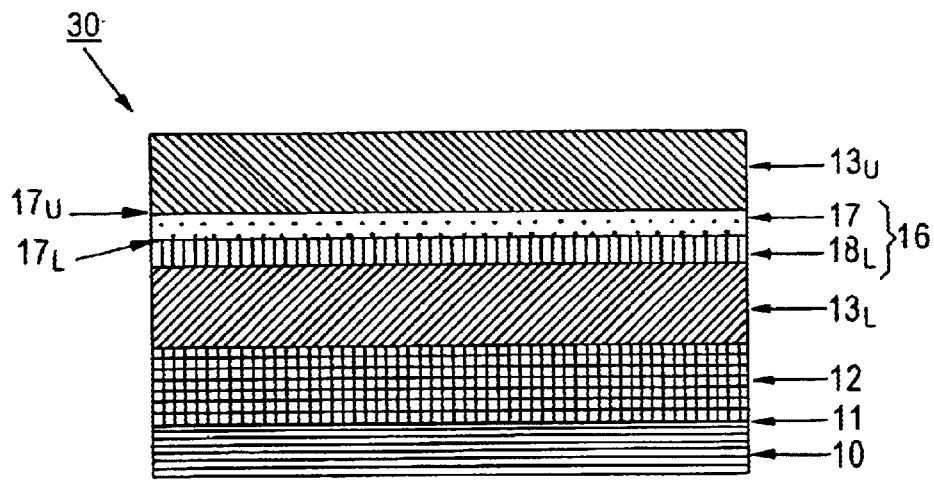
Figure 8:
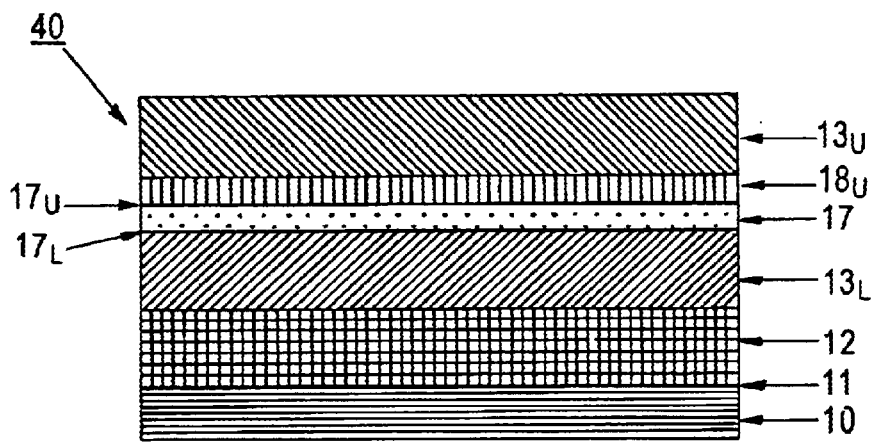

According to the invention, it is not necessary to provide thin ferromagnetic interface layers 18 at each of the interfaces between the thin non-magnetic spacer layer 17 and the lower and upper ferromagnetic layers $13_L$ and $13_U$ in order to obtain enhanced magnetic coupling therebetween. Referring more particularly to FIGS. 7–8, shown therein are embodiments 30 and 40 fabricated according to the principles of the present invention, wherein the magnetic coupling structure 16 is composed of a thin ferromagnetic interface layer 18 provided at only one of the interfaces between the thin non-magnetic spacer layer 17 and the lower and upper ferromagnetic layers $13_L$ and $13_U$, respectively. More specifically, FIG. 7 illustrates an embodiment of the invention wherein only a lower thin ferromagnetic 10 interface layer $18_L$ is provided, i.e., at the interface between the lower surface $17_L$ of the thin non-magnetic spacer layer 17 and the upper surface of the lower ferromagnetic layer $13_L$, whereas FIG. 8 illustrates an embodiment of the invention wherein only an upper thin ferromagnetic interface layer $18_U$ is provided, i.e., at the interface between the upper surface $17_U$ of the thin non-magnetic spacer layer 17 and lower surface of the upper ferromagnetic 15 layer $13_U$.

Figure 9:
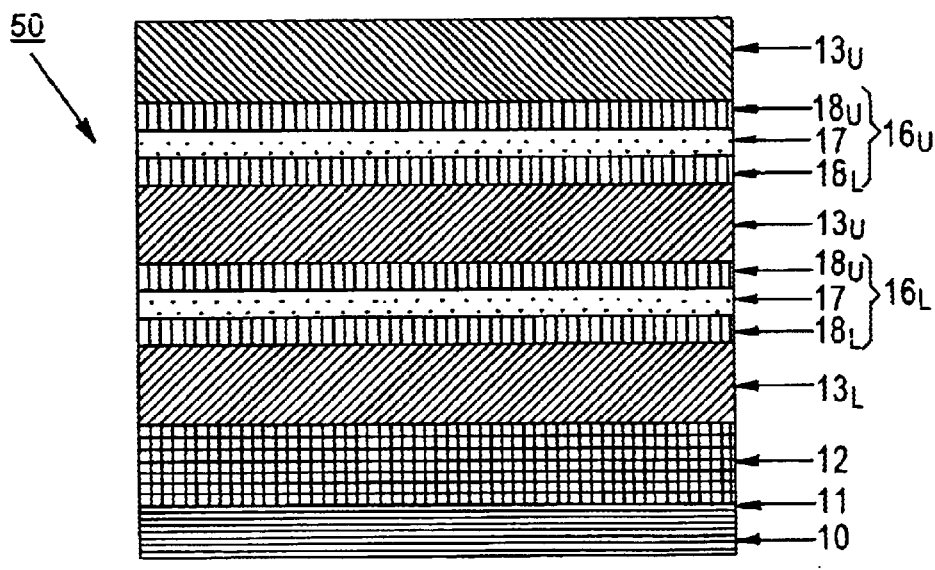

The present invention also contemplates formation of magnetic recording media comprising n superposed pairs of magnetically coupled ferromagnetic layers 13 (where n is at least 2), wherein the ferromagnetic layers of each pair are separated by a magnetic coupling structure 16 composed of a thin non-magnetic spacer layer 17 and at least one of a lower thin ferromagnetic interface layer $18_L$ and an upper thin ferromagnetic interface layer $18_U$. Referring to FIG. 9, shown therein, by way of illustration but not limitation, is a magnetic recording medium 50 according to the invention, wherein n=2, and which includes three ferromagnetic layers 13 forming two (2) spaced-apart pairs of ferromagnetic layers, i.e., lower, middle, and upper layers $13_L$, $13_M$, and $13_U$, respectively, spaced-apart by lower and upper magnetic coupling structures $16_L$ and $16_U$, respectively, each of the magnetic coupling structures $16_L$ and $16_U$ composed of a thin non-magnetic spacer layer 17 sandwiched between lower and upper thin ferromagnetic interface layers $18_L$ and $18_U$, respectively.

The present invention thus advantageously provides high quality, thermally stable, high areal recording density magnetic recording media, which media achieve improved thermal stability via enhanced magnetic coupling of the ferromagnetic recording layer with another ferromagnetic or antiferromagnetic layer. Moreover, the inventive methodology can be practiced in a cost-effective manner utilizing conventional manufacturing technology and equipment (e.g., sputtering technology/equipment) for automated, large-scale manufacture of magnetic recording media, such as hard disks. Finally, the invention is not limited to use with hard disks but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetic recording medium having thermal stability, comprising:

a non-magnetic substrate having at least one surface; and a layer stack overlying said at least one surface, comprised of at least one layer pair composed of first and second superposed ferromagnetic layers spaced-apart by a magnetic coupling structure comprising a non-magnetic spacer layer and at least one ferromagnetic interface layer at at least one interface between said non-magnetic spacer layer and said first and second ferromagnetic layers; and wherein said at least one ferromagnetic interface layer comprises an about Å1 monolayer thick to an about 40 Å thick layer of a ferromagnetic material comprising a Co alloy with at least one of Pt, Cr, B, Fe, Ni, and Ta, wherein the Co concentration in the alloy varies across the thickness of the interface layer from higher near the interface with the spacer layer to lower near an interface with a ferromagnetic layer.

2. The magnetic recording medium as in claim 1, wherein:

said magnetic coupling structure is composed of said non-magnetic spacer layer and a ferromagnetic interface layer at one of the interfaces between said first and second ferromagnetic layers and said non-magnetic spacer layer.

3. The magnetic recording medium as in claim 2, wherein:

said ferromagnetic interface layer is at the interface between said first ferromagnetic layer and said non-magnetic spacer layer.

4. The magnetic recording medium as in claim 2, wherein:

said ferromagnetic interface layer is at the interface between said second ferromagnetic layer and said non-magnetic spacer layer.

5. The magnetic recording medium as in claim 1, wherein:

said magnetic coupling structure is composed of said non-magnetic spacer layer and a thin ferromagnetic interface layer at each of the interfaces between said first and second ferromagnetic layers and said non-magnetic spacer layer.

6. The magnetic recording medium as in claim 1, wherein:

said layer stack includes a plurality of layer pairs composed of superposed first and second ferromagnetic layers, said first and second ferromagnetic layers of each pair being spaced-apart by a magnetic coupling structure comprised of a non-magnetic spacer layer and at least one thin ferromagnetic interface layer.

7. The magnetic recording medium as in claim 1, wherein:

said first and second ferromagnetic layers each comprise an about 10 to about 300 Å thick layer of an alloy of cobalt (Co) with at least one of platinum (Pt), chromium (Cr), boron (B), iron (Fe), tantalum (Ta), nickel (Ni), molybdenum (Mo), vanadium (V), niobium (Nb), and germanium (Ge).

8. The magnetic recording medium as in claim 1, wherein:

said non-magnetic spacer layer comprises an about 2 to about 20 Å thick layer of a non-magnetic material selected from the group consisting of ruthenium (Ru), Ru-based alloys, Cr, and Cr-based alloys.

9. The magnetic recording medium as in claim 8, wherein:
said thin non-magnetic spacer layer comprises an about 6 to about 10 Å thick layer of Ru or a Ru-based alloy.

10. The magnetic recording medium as in claim 1, wherein:
said at least one ferromagnetic interface layer comprises an about 2 to about 20 Å thick layer of a ferromagnetic material having a saturation magnetization value $M_s$>500 emu/cc.

11. A longitudinal magnetic recording medium as in claim 1, comprising:
seed and underlayers between said at least one surface of said substrate and said layer stack for controlling the crystallographic texture of said at least one layer pair of first and second ferromagnetic layers;
a said layer stack wherein said first and second superposed ferromagnetic layers are each comprised of an about 10 to about 300 Å thick layer of an alloy of Co with at least one of Pt, Cr, B, Fe, Ta, Ni, Mo, V, Nb, and Ge, said first and second ferromagnetic layers being spaced-apart by a magnetic coupling structure comprising said non-magnetic spacer layer comprised of an about 6 to about 10 Å thick layer of Ru or a Ru-based alloy-and said at least one ferromagnetic interface layer comprised of an about 2 to about 20 Å thick layer; and
protective overcoat and lubricant topcoat layers provided on an upper surface of said layer stack.

12. A method of forming a magnetic recording medium having thermal stability, comprising steps of:
(a) forming a layer stack overlying at least one surface of a non-magnetic substrate, said layer stack including at least one layer pair composed of first and second superposed, spaced-apart ferromagnetic layers; and
(b) providing a magnetic coupling structure between said at least one pair of first and second ferromagnetic layers, said magnetic coupling structure comprising a non-magnetic spacer layer and at least one ferromagnetic interface layer at at least one interface between said non-magnetic spacer layer and said first and second ferromagnetic layers;
wherein said non-magnetic spacer layer comprises an about 6 to about 10 Å thick layer of Ru or a Ru-based alloy and said at least one ferromagnetic interface layer comprises an about 1 monolayer thick to an about 40 Å thick layer of a cobalt alloy, wherein the concentration of Co in said alloy varies across the thickness of the interface layer from higher near the interface with the spacer layer to low nearer an interface with a ferromagnetic layer.

13. The method according to claim 12, comprising providing said ferromagnetic interface layer at one of the interfaces between said first and second ferromagnetic layers and said non-magnetic spacer layer.

14. The method according to claim 13, comprising providing said ferromagnetic interface layer at the interface between said first ferromagnetic layer and said non-magnetic spacer layer.

15. The method according to claim 13, comprising providing said ferromagnetic interface layer at the interface between said second ferromagnetic layer and said non-magnetic spacer layer.

16. The method according to claim 12, comprising providing a said ferromagnetic interface layer at each of the interfaces between said first and second ferromagnetic layers and said non-magnetic spacer layer.

17. amended) The method according to claim 12, comprising providing each of said first and second ferromagnetic layers as an about 10 to about 300 Å thick layer of an alloy of Co with at least one of Pt, Cr, B, Fe, Ta, Ni, Mo, V, Nb, and Ge; said non-magnetic spacer layer as an about 2 to about 20 Å thick layer of a non-magnetic material selected from Ru, Ru-based alloys, Cr, and Cr-based alloys; and said at least one ferromagnetic interface layer as an about 2 to about 20 Å thick layer of a ferromagnetic material having a saturation magnetization value $M_s$ >500 emu/cc.

* * * * *

UNITED STATES PATENT AND TRADEMARK OFFICE
CERTIFICATE OF CORRECTION

PATENT NO.    : 6,645,614 B1
DATED         : November 11, 2003
INVENTOR(S)   : Erol Girt et al.

It is certified that error appears in the above-identified patent and that said Letters Patent is hereby corrected as shown below:

<u>Column 10,</u>
Line 21, delete symbol "Å"

Signed and Sealed this

Sixteenth Day of March, 2004

JON W. DUDAS
*Acting Director of the United States Patent and Trademark Office*